Feb. 3, 1925.

O. BOYER 1,525,063

CORN HUSKING MACHINE

Filed July 24, 1923     4 Sheets-Sheet 1

WITNESSES
Louis Goodman
E. N. Lovewell

INVENTOR
Oliver Boyer

BY
[signature]

ATTORNEY

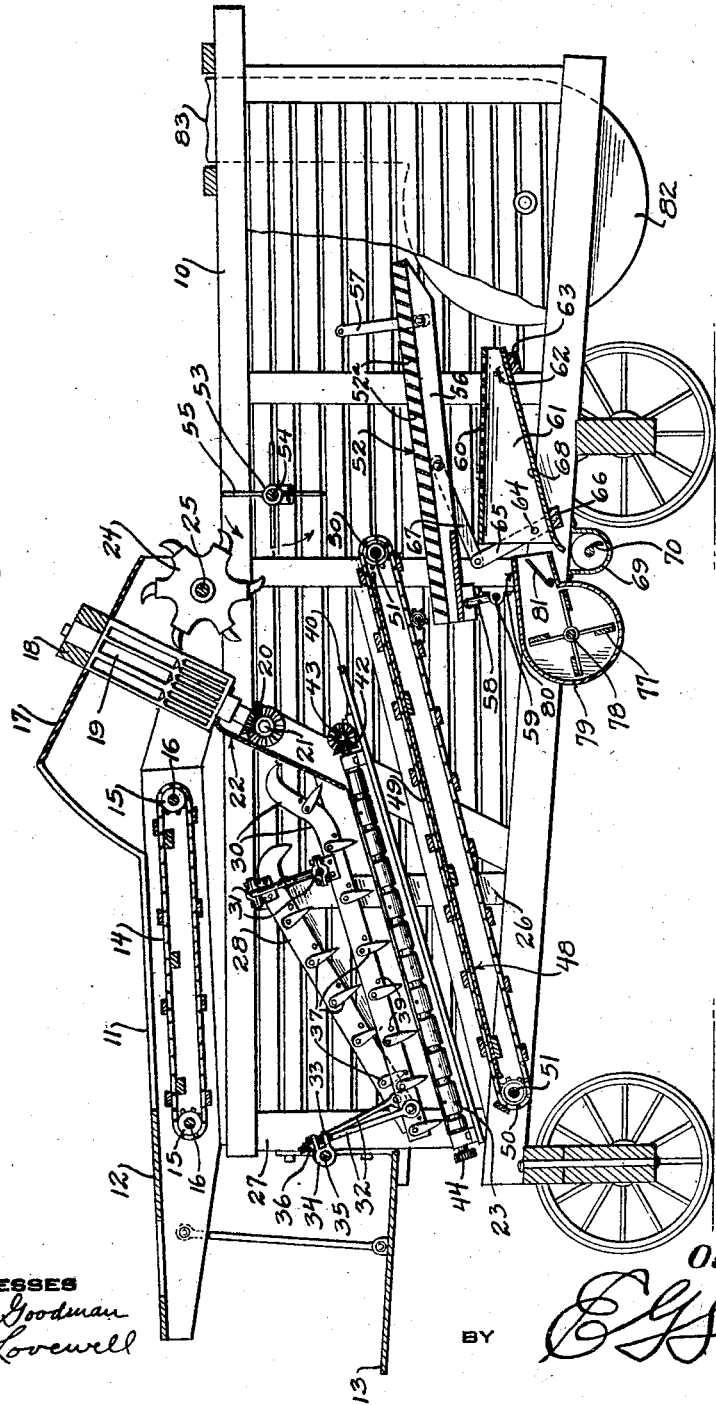

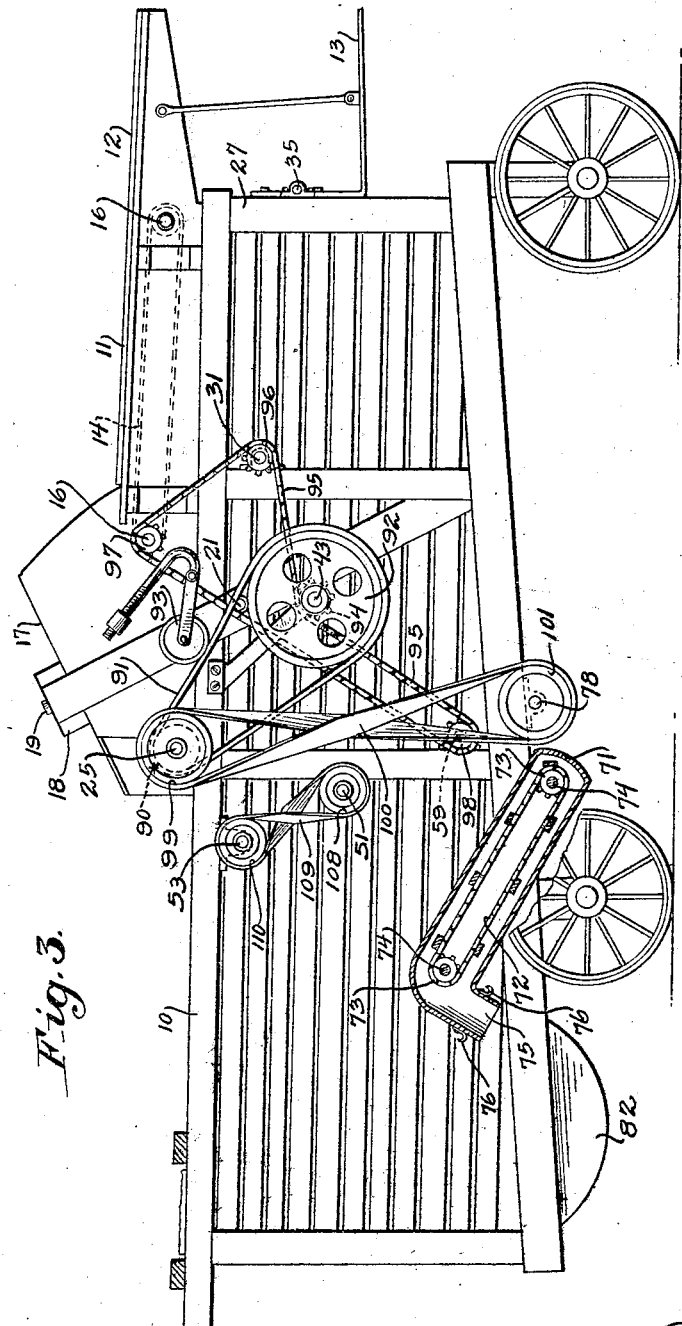

Feb. 3, 1925.
O. BOYER
1,525,063
CORN HUSKING MACHINE
Filed July 24, 1923
4 Sheets-Sheet 4
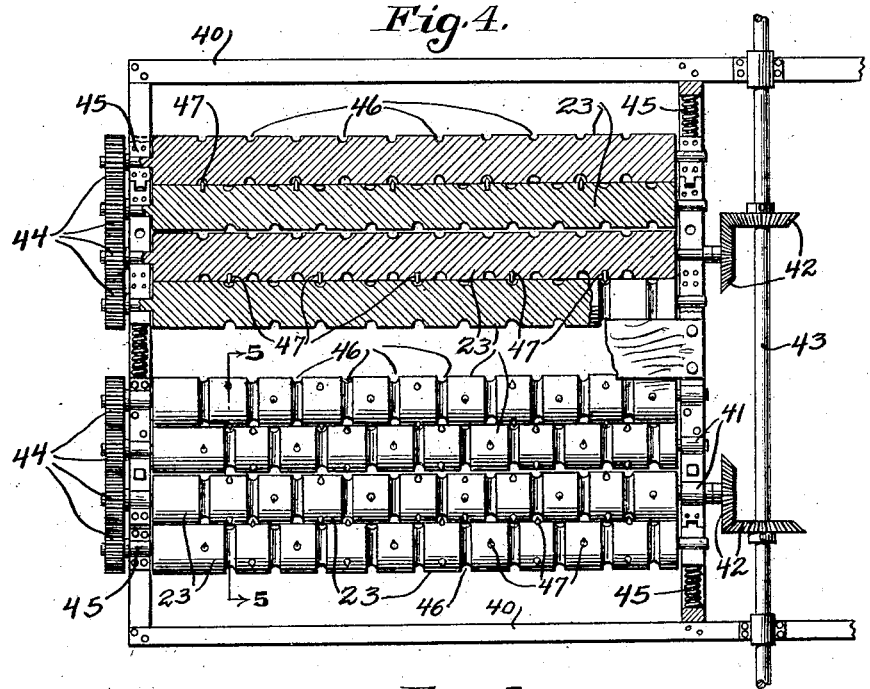
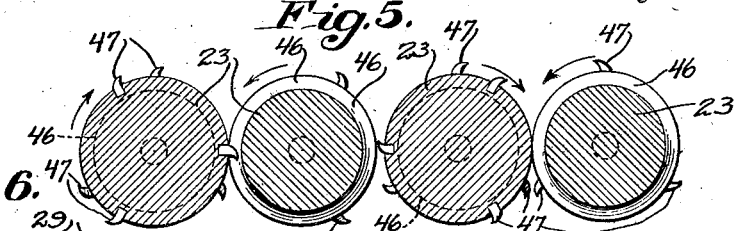
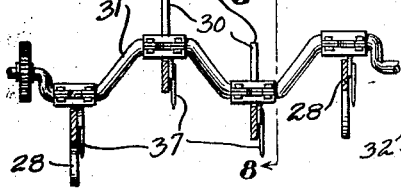
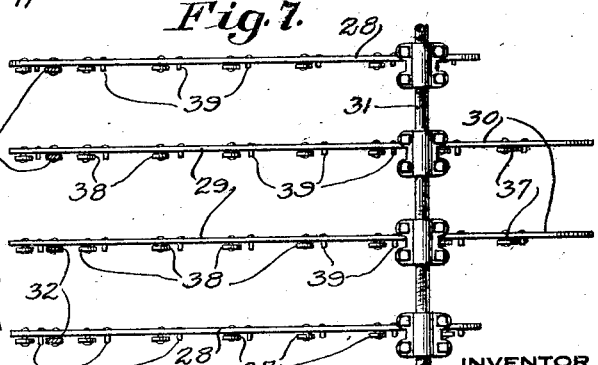
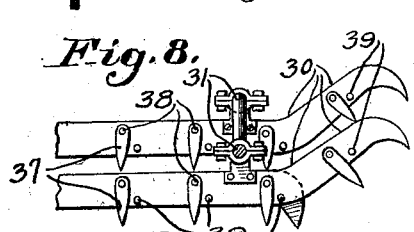
INVENTOR
Oliver Boyer
BY
ATTORNEY Patented Feb. 3, 1925.

1,525,063

UNITED STATES PATENT OFFICE.

OLIVER BOYER, OF SPENCERVILLE, OHIO.

CORN-HUSKING MACHINE.

Application filed July 24, 1923. Serial No. 653,477.

*To all whom it may concern:*

Be it known that I, OLIVER BOYER, a citizen of the United States, residing at Spencerville, in the county of Allen and State of Ohio, have invented a new and useful Corn-Husking Machine, of which the following is a specification.

This invention relates to a corn husking machine which is adapted to snap the ears from the stalks after the latter have been harvested and collected, husk the ears, shred the stalks, and deliver the husks and shredded stalks to a suitable place for storage.

The object of the present invention is to simplify and otherwise improve the husking mechanism, the means for feeding the ears thereto, the means for directing the shredded stalks through the machine, and the mechanism for operating the shelled corn separator, as well as to modify the arrangement of the driving mechanism of the various parts so as to improve the general organization of the machine and the arrangement of the various elements thereof, whereby each is coordinated with the others in such a manner as to result in a smooth, continuous and uniform operation.

The invention will be best understood from a consideration of the following detailed description taken in connection with the accompanying drawings which illustrate the preferred construction.

In the drawings:

Figure 2 is a vertical longitudinal section thereof.

Figure 3 is a side elevation taken from the side opposite to that shown in Figure 1, certain parts being shown in section.

Figure 4 is a view, partly in plan and partly in section, of the husking rolls.

Figure 5 is a sectional view on the line 5—5 of Figure 4.

Figure 6 is a transverse sectional view through the feeder of the husking mechanism.

Figure 7 is a plan view thereof.

Figure 8 is a sectional view on the line 8—8 of Figure 6.

Figure 1:
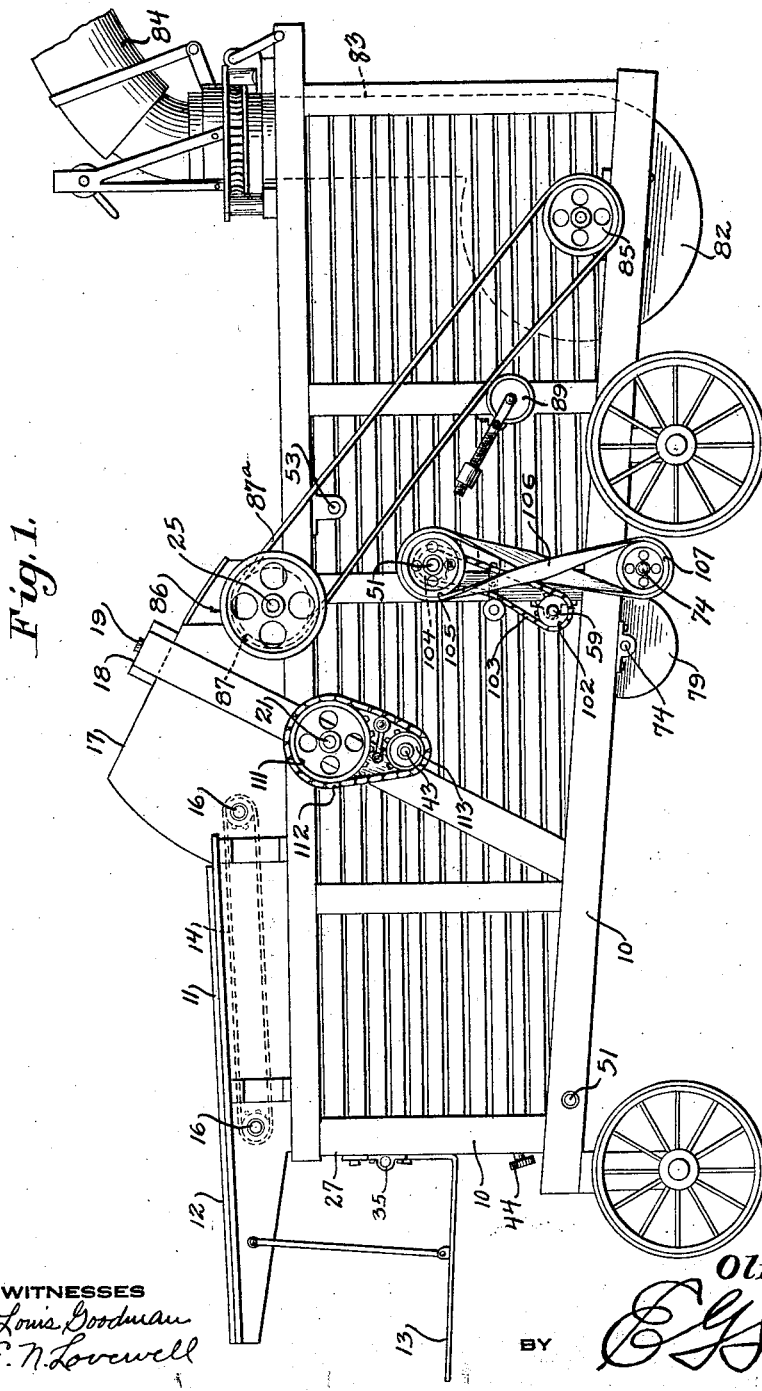
Figure 1 is a side elevation of a machine embodying my invention.

The numeral 10 denotes the main frame of the machine, which may be of any form desired, and will not be described in detail since it forms no part of the present invention. Secured to the upper forward part of the main frame and extending forwardly therefrom is a feed trough 11, having a table 12 across the front part thereof to support corn stalks as they are fed into the machine by an attendant standing on a platform 13 supported beneath the front part of the feed trough.

An endless feeding conveyor 14 is located within the trough 11, and travels over sprocket wheels 15 secured on transverse shafts 16 journalled within the trough. The sides of the trough 11, at the rear end, are extended upwardly and provided with a cover 17, to form what may be termed an ear separating chamber. Surrounding this chamber is a frame 18, inclined upwardly and rearwardly, within which are journalled a plurality of snapping rolls 17. Four of these rolls are usually provided, but since their specific construction constitutes no part of the present invention a detailed description thereof is unnecessary.

The snapping rolls are preferably driven by means of bevelled gearing 20 from a transverse shaft 21 journalled in the sides of the frame 18. The ears as they are snapped from the stalks, by the snapping rolls, slide or roll downwardly over the apron or housing 22, which covers the gearing 20, while the stalks, passing between the snapping rolls, are shredded by the shredding mechanism 24 mounted on a transverse shaft 25.

The ears are directed by the apron 22 onto the husking rolls 23 on each side of which are the upright posts 26 and 27 for supporting the feeder mechanism, by means of which the ears are advanced longitudinally of the husking rolls. The feeder mechanism comprises outer feed bars 28 and inner feed bars 29, which are supported above the husking rolls, there being one feed bar for each pair of rolls. The inner feed bars at their rear ends are extended rearwardly and upwardly, as shown at 30, in alinement with the spaces between the pairs of snapping rolls 19, so as to assist in feeding the ears downwardly along the apron 20. The feed bars are journalled at their forward ends on a transverse crank shaft 31 journalled in the posts 26, while the rear ends of the bars are pivotally supported at the lower ends by individual depending links 32, slidably supported in ears 33 formed on bearing blocks 34, which are journalled on a transverse rod 35 carried by the posts 27. The upper ends of the links 32 are provided with nuts 36 which may be adjusted to limit the extent of downward movement of the bars 28 and 29 at their forward ends, while permitting the same to rise freely in case of any unusual obstruction. Each of the bars 28 and 29 has a plurality of fingers 37, pivoted at 38 and depending below the bar so as to enter between the converging upper surfaces of the rolls to dislodge any material which may become clogged therein. Pegs 39 are provided in the bars behind the respective fingers 37 to limit their pivotal movement backwardly, while the fingers are permitted to swing forward freely during the backward movement of the bar. The ears of corn, which are husked during their progressive movement over the husking rolls, will be discharged from the lower ends of the rolls, and any suitable means may be provided for receiving the same.

The husking rolls are supported by a suitable frame 40 between the posts 26 and 27. In the present instance four pairs of husking rolls are provided, but the exact number of rolls is immaterial. Certain of the rolls are journalled in fixed bearings 41, and driven through bevelled gearing 42 from a transverse shaft 43, while the other ends of the rolls are provided with spur gearing 44 normally intermeshing. One roll of each pair, however, is provided with yieldable bearings 45 to permit the rolls to separate slightly when the feed of the corn is heavy, thus permitting the husks to pass between the rolls, but without permitting the ears to pass.

Each husking roll is provided with a series of circumferential grooves 46 alternating with series of forwardly curved pegs 47, the pegs of one roll registering with the grooves of the adjacent roll of the same pair. The pegs of each roll are also progressively offset so as to form spiral rows of pegs about each roll, whereby the ears of corn as they are fed over the rotating rolls are engaged successively by the spirally arranged pegs and advanced successively from one peg to the next while the husks are stripped therefrom. Since each of the grooves 46 extends completely around the roll, the corresponding pegs will maintain the same operative relation thereto, regardless of the relative circumferential position of the rolls.

Mounted directly beneath the husking rolls is an upwardly and rearwardly extending platform 48 for receiving the husks as they are dropped between the rolls, and also any kernels of corn which may be shelled during the husking operation. An endless conveyer 49, mounted on sprocket wheels 50 which are secured to transverse shafts 51, travels rearwardly over the platform 48 and conveys the husks along with the shelled corn rearwardly and delivers the same to an oscillatory grid 52. The shredded stalks also are delivered from the shredder 24 onto the grid. In order to assist in directing the shredded stalks, a beater 53 is secured to a transverse shaft 54 in rear of and somewhat below the shredder, and is provided with blades 55 revolving in close proximity to the shredder blades so as to engage any fragments of stalks, which have a tendency to adhere to the blades, and all of the shredded fodder will be directed downwardly between the beater and the rear end of the conveyer 49, where the fodder, husks and whatever shelled corn there may be, will be deposited on the grid 52.

The grid includes a frame 56, across which extend spaced slats 52ª, between which the shelled corn and the smaller particles of fodder may pass, while the greater part of the fodder is carried rearwardly by a succession of impulses and discharged from the rear end of the grid. The grid, as will be understood, is supported for oscillatory movement by links 57 at the rear end, and by a crank 58 formed on a transverse crank shaft 59 journalled beneath the front end of the grid, by means of which motion is imparted to the grid.

The shelled corn and small particles of fodder, which pass between the slats 52ª of the grid, are delivered onto a screen 60. This screen is carried by a frame 61 which is supported at its rear end by links 62 pivotally mounted on a cross bar 63, and at its forward end the frame is pivotally connected at 64 to a lever 65 fulcrumed at its lower end to a cross bar 66, and connected at its upper end by a link 67 to the grid frame 56. By means of this construction, it is to be noted, that the oscillatory movements of the grid transmit a similar motion to the screen 60 but of less degree, whereby the kernels will drop through the perforations in the screen 60 onto the inclined bottom 68 of the screen frame. The shelled kernels slide downwardly on the inclined bottom 68 and drop into a transversely extending trough 69 attached to the underside of the frame 10, within which operates a screw conveyer 70. The shelled kernels are thus conveyed to one side of the machine into a chute 71, Figure 3. Within this chute is an endless conveyer 72 passing over sprocket wheels 73 secured to the shafts 74, discharging the shelled corn through the spout 75, around which a bag for receiving the shelled corn may be supported by means of hooks 76.

During the passage of the shelled corn and small particles of fodder from the grid 52 through the screen 60, the same are subjected to the blast from a fan 77 carried by a shaft 78 within a fan casing 79 mounted in front of the screen frame 61, and having an outlet 80 directed toward the screen, within which may be located a damper 81 for controlling the direction and volume of the blast. Thus as the kernels of corn pass downwardly into the conveyer trough 69, the particles of fodder being comparatively lighter, will be blown upwardly into the main stream of fodder, which is being discharged as above described, and will be delivered to a blower 82, of the usual type, which discharges the same upwardly through a discharge pipe 83 to a stacker 84.

The means by which the different elements of the machine are actuated will now be described. The shredder shaft 25, which constitutes the main drive shaft of the machine is provided with a main drive pulley 86, which is driven by a belt from a motor or other suitable source of power. A second pulley 87 is secured to the shaft 25 and connected by a suitable belt 87ª to a pulley 85, which drives the blower 82. The belt 87ª is preferably provided with a gravity operated belt tightener 89, by means of which the tension of the belt may be properly adjusted. The main drive shaft 25 is also provided at the opposite side of the machine with a pulley 90, Figure 3, which is connected by a belt 91 to a comparatively large pulley 92 secured to the transverse shaft 43, which operates the husking rolls. The belt 91 may also be provided with a suitable tightener 93. The shaft 43 also has secured thereto a sprocket wheel 94, which drives a sprocket chain 95 which passes over a sprocket wheel 96 secured to the crank shaft 31 for operating the feeder, a sprocket wheel 97 secured to one of the shafts 16 for operating the conveyer 14, and a sprocket wheel 98 secured to the crank shaft 59 for operating the grid. The main drive shaft 25 also carries another pulley 99, adjacent to the pulley 90, and which is connected by a cross belt 100 to a pulley 101 secured to the fan shaft 78. The drive sprocket 102 is secured to the shaft 59 at the side of the machine opposite to the sprocket wheel 98, and is operatively connected by a chain 103 to a sprocket wheel 104 secured to one of the shafts 51 for operating the conveyer 49. The shaft 51 is also provided with a pulley 105 connected by a cross belt 106 to the pulley 107 secured to one of the conveyer shafts 74 for driving the conveyer 72. This shaft 74 also carries the screw conveyer 70. A pulley 108 secured to the shaft 51 at the opposite side of the machine, is connected by a cross belt 109 to a pulley 110 secured to the shaft 53 for operating the beater 54. Secured to the shaft 21 which drives the snapping rolls is a sprocket 111 connected by a sprocket chain 112 to a sprocket 113 secured to one end of the shaft 43. Thus it will be noted that the shaft 43 constitutes a common driving shaft for the snapping rolls and the husking rolls.

From the foregoing description, it will be understood that as the stalks are fed to the snapping rolls 19, the ears will be snapped therefrom and delivered to the husking rolls 23 over which the ears will be positively and expeditiously advanced by the clawing action of the feeders 28 and 29. The stalks as they are shredded are carried downwardly and rearwardly by the beater 53 where they are joined by the stream of husks from the husking rollers, and are delivered onto the oscillatory grid 52. The kernels, which may become shelled by the action of the husking rollers, as well as any kernels which may be shelled during the snapping operation, readily drop through the openings in the slats 52ª during the oscillatory movement of the grid while the fodder is delivered to the blower 82 and thence to the stacker 84. The screen 60 and the fan 77 cooperating therewith serve to separate the shelled corn and the latter is delivered to the screw conveyer 70, and thence to a bag carried by the hooks 76 on the spout 75. While the small particles of fodder are blown into the stream of shredded stalks passing over the rear end of the grid 52 and are delivered with the same to the stacker.

The specific construction of the various elements of the machine and the arrangement by which the movements thereof are coordinated have been described and illustrated in their preferred form, but it is to be understood that various modifications may be made therein without departing from the essential principles of the invention as included within the scope of the appended claims.

What is claimed is:

1. In a corn husking machine, the combination of a plurality of husking rolls, feeders located above the spaces between the rolls, a shaft extending transversely to the rolls and having cranks on which the feeders are journalled at one end, a supporting member extending transversely above the other ends of the feeders, links depending from said supporting member and individually pivoted to the adjacent ends of the feeders for supporting the same, vertically adjustable means for positively limiting the downward movement of the links said feeders having depending pivoted fingers disposed in vertical planes above the rolls, pegs on the feeders limiting the rearward movement of the fingers, and means for rotating the crank shaft in a direction to advance the feeders while in proximity to the rolls.

2. In a corn husking machine, the combination of a plurality of pairs of husking rolls, feeders located longitudinally above the respective pairs of rolls, a shaft having cranks on which the respective feeders are journalled at their rear ends, a supporting rod extending transversely above the forward ends of the feeders, blocks journalled on said rod, depending links slidably supported in said blocks by which the front ends of the feeders are individually supported, and means for rotating the crank shaft to oscillate the feeders.

3. In a corn husking machine, the combination of a plurality of pairs of inclined husking rolls, feeders located above the rolls and extending in vertical planes centrally of the respective pairs of rolls, a shaft extending transversely above the rolls and having cranks on which the rear ends of the feeders are journalled, a supporting rod extending transversely above the forward ends of the feeders, blocks journalled on said rod, depending links slidably supported in said blocks and pivotally supporting the forward ends of the feeders, means for adjustably limiting the downward movement of said links, said feeders having depending pivoted fingers adapted to extend between the rolls of the respective pairs, pegs on the feeders limiting the rearward movement of the fingers, and means for rotating the crank shaft to oscillate said feeders.

4. In a corn husking machine, the combination of a plurality of pairs of upwardly and rearwardly inclined husking rolls, upwardly and rearwardly inclined snapping rolls forming an angle with the husking rolls at their rear ends, an apron for guiding ears of corn from the snapping rolls to the husking rolls, feeders above the respective pairs of husking rolls, and means for oscillating said feeders to advance the ears over the husking rolls, certain of said feeders having integral rearward angular extensions provided with means to engage and advance the ears over the apron.

5. In a corn husking machine, the combination of a plurality of husking rolls, a plurality of snapping rolls forming an angle with the husking rolls at their rear ends, a common transverse driving shaft geared to the snapping and husking rolls, an apron for guiding ears of corn from the snapping to the husking rolls and forming a housing for said gearing, feeders above the husking rolls, depending fingers pivoted to the feeders, means for oscillating the feeders to advance the ears of corn over the husking rolls, and pegs for limiting the rearward movement of the fingers while the feeders are advancing, certain of said feeders having integral rearward angular extensions provided with similar pegs and finger to engage and advance the ears over the apron.

6. In a corn husking machine, the combination of a plurality of husking rolls, upwarding and rearwardly inclined snapping rolls forming an angle with the husking rolls at their rear ends, an apron for guiding ears of corn from the snapping to the husking rolls, feeders located above the husking rolls, a shaft having cranks on which the respective feeders are journalled at one end, a supporting rod extending transversely above the feeders and having depending links by which the other ends of the feeders are individually supported, and means for rotating the crank shaft in a direction to advance the feeders while in proximity to the rolls, the intermediate feeders having integral rearward angular extensions provided with means to engage and advance the ears of corn over the apron while the outer feeders terminate at the upper ends of the husking rolls.

In testimony that I claim the foregoing as my own, I have hereto affixed my signature.

OLIVER BOYER.